United States Patent
Trivedi et al.

(10) Patent No.: US 12,184,514 B2
(45) Date of Patent: Dec. 31, 2024

(54) CENTRALIZED DATA STORAGE AND SORTING APPARATUS AND METHOD FOR MONITORING KPIS ASSOCIATED WITH A COMMUNICATION NETWORK

(71) Applicant: Rakuten Mobile, Inc., Tokyo (JP)

(72) Inventors: Vishvesh Trivedi, Tokyo (JP); Anshul Bhatt, Tokyo (JP); Dhananjay Chaubey, Tokyo (JP); Alok Singh Pawar, Madhya Pradesh (IN); Manish Patidar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/757,452

(22) PCT Filed: Mar. 4, 2022

(86) PCT No.: PCT/US2022/018844
§ 371 (c)(1),
(2) Date: Jun. 16, 2022

(87) PCT Pub. No.: WO2023/167679
PCT Pub. Date: Sep. 7, 2023

(65) Prior Publication Data
US 2024/0163181 A1    May 16, 2024

(51) Int. Cl.
*H04L 41/5009*    (2022.01)

(52) U.S. Cl.
CPC ............... *H04L 41/5009* (2013.01)

(58) Field of Classification Search
CPC ..... H04L 41/5009; H04L 41/22; H04L 43/04; H04W 12/08
See application file for complete search history.

(56) References Cited

U.S. PATENT DOCUMENTS

2023/0300042 A1*    9/2023    Kumar ................... H04L 43/12
                                                                455/456.1

* cited by examiner

*Primary Examiner* — Abdulkader M Alriyashi
(74) *Attorney, Agent, or Firm* — HAUPTMAN HAM, LLP

(57) ABSTRACT

An apparatus is configured to process user credentials received by way of a graphical user interface output by a display, retrieve a user profile associated with the user credentials from a database, and access a central repository to retrieve stored data based on the user profile. The apparatus is also configured to cause a list of the stored data corresponding to the user profile to be displayed. The stored data is displayed according to a plurality of sortable parameters indicative of the stored data included in the list. The apparatus is further configured to process a user input received by way of the graphical user interface to add new data to the central repository, cause a configuration profile user interface to be output by the display, and cause the new data to be added to the central repository and sorted according to a generated configuration profile.

20 Claims, 9 Drawing Sheets

FIG. 4

Counter View 400

| Measurement Name | Measurement ID | Mo Name | Counter ID | Counter Name | Release | Counter Type | Unit | ... |
|---|---|---|---|---|---|---|---|---|
| AAA | 123 | FFF | KKK | PPP | 1.0 | KPI Counter | Sec | |

FIG. 5

Add Counter — 500

- Measurement Name Input Field 501a
- Measurement ID Input Field 501b
- Mo Name Input Field 501c
- Technology Input Field 501d
- Counter ID Input Field 501e
- Counter Name in View Input Field 501f
- Release Input Field 501g
- Counter Type Input Field 501h
- Sub-Category Input Field 501j
- Time Aggregation Input Field 501i
- Node Aggregation Input Field 501k
- Unit Input Field 501n
- Trigger Type Input Field 501m
- Sampling Interval Input Field 501o
- Range Input Field 501p
- Description Input Field 501q
- Updated Description Input Field 501r Save / Cancel

FIG. 7

Add New Library 700

- Create Multiple Categories
- Create Single Category

- Domain Input Field 701a
- Vendor Input Field 701b
- Node Input Field 701c
- Technology Input Field 701d
- Version Input Field 701e
- Category Name Input Field 701f
- Measurement ID Input Field 701g Cancel | Save

CENTRALIZED DATA STORAGE AND SORTING APPARATUS AND METHOD FOR MONITORING KPIS ASSOCIATED WITH A COMMUNICATION NETWORK

RELATED APPLICATIONS

The present application is a National Phase of International Application No. PCT/US2022/018844 filed Mar. 4, 2022.

BACKGROUND

Network operators, network service providers and device manufacturers (e.g., wireless, cellular, etc.) are continually challenged to deliver value and convenience to consumers by, for example, providing compelling communication networks and network services that are dependable and capable of being flexibly constructed, scalable, diverse, and economically operated. To provide such communication networks and network services, network operators, network service providers and device manufacturers often track key performance indicators (KPIs) that are indicative of an operating state of a communication network and/or various network services and/or network devices.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a diagram of a graphical user interface, in accordance with one or more embodiments.

FIG. 5 is a diagram of a graphical user interface, in accordance with one or more embodiments.

FIG. 7 is a diagram of a graphical user interface, in accordance with one or more embodiments.

DETAILED DESCRIPTION

Figure 1:
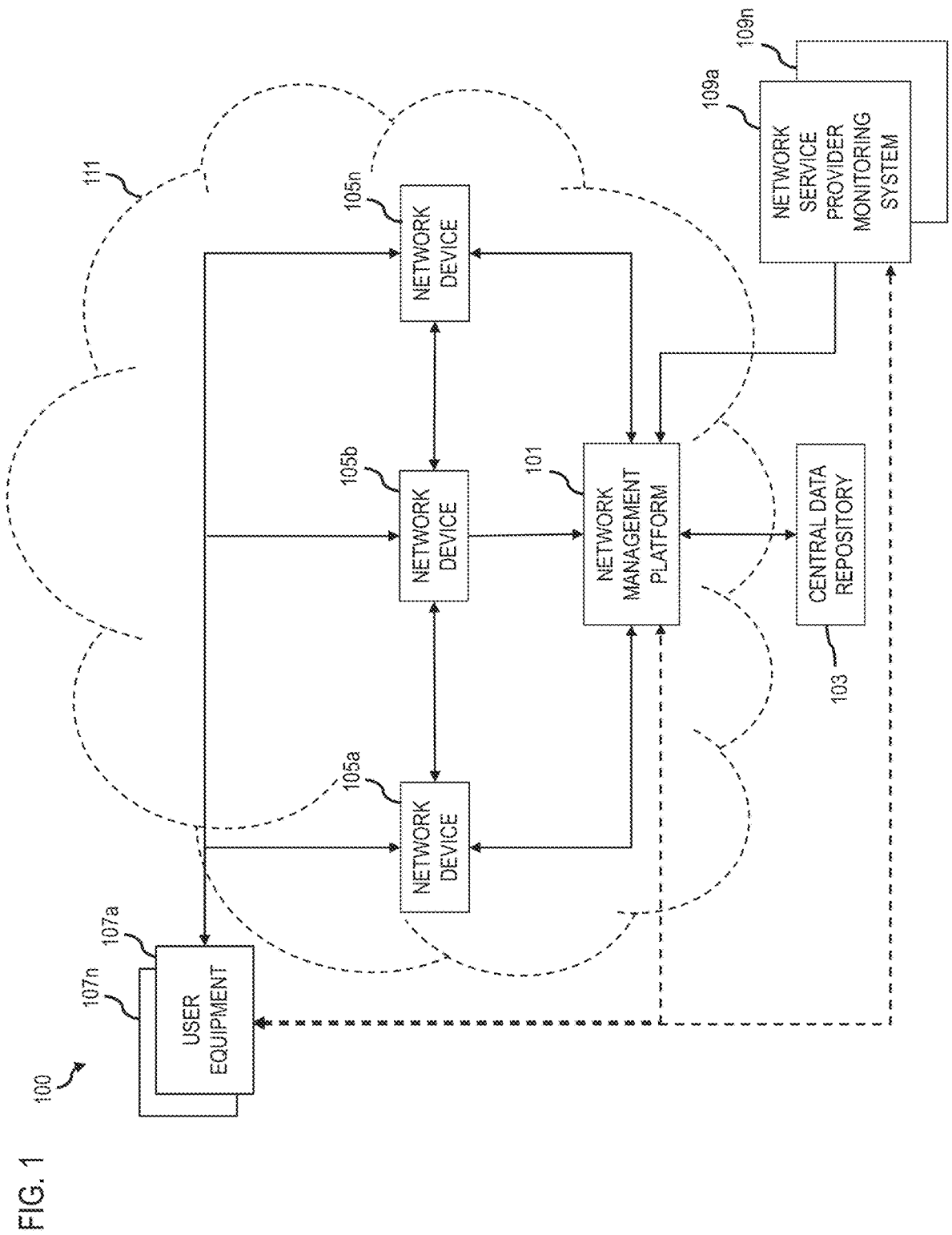
FIG. 1 is a diagram of a KPI monitoring and centralized data storage system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Communication networks and network services are often provided by static or inflexible systems that are difficult to configure, scale, and deploy over various target areas. Dependable provision of communication networks and/or network services that are capable of being flexibly constructed, scalable and diverse is often reliant on the collection, analysis and reporting of information regarding multiple network functions, network services, network devices, etc. that affect the performance, accessibility, configuration, scale, and/or deployment of a communication network, various network functions, network services, and the like.

Network service providers often deploy network monitoring systems that track various key performance indicators (KPIs) of an aspect of a network for determining how well that aspect and/or the network is performing. KPIs are often KPI values and/or trends that are compared to certain thresholds to indicate the relative performance of a communication network, network service, network device, etc. The KPI values are often based on monitoring data referred to herein as system data.

Sometimes, when a KPI value for a certain network function, network service or feature is below a preset threshold, the KPI value may imply that the network is operating normally, whereas when the KPI value is above or equal to the preset threshold, the KPI value implies that the network is operating below expectation, which in turn may indicate that some unexpected event (e.g., a hardware failure, capacity overload, a cyberattack, etc.) has occurred. Accordingly, a series of actions can be carried out by the network monitoring system such as alerting the network operator, shifting a network function from a problematic server to a healthy server, temporarily shutting down the network, or some other suitable action. Of course, depending on the network configuration, a condition in which the KPI value is higher than or equal to a threshold can also indicate that the network is operating normally, while a condition in which the KPI value is below the threshold indicates that the network is operating below expectation. Several other types of threshold configurations are possible as the threshold configurations may vary depending on the needs of a specific user or specific network operator, depending on individual preference, type of KPI being monitored, type of KPI created by a user for monitoring, type of system data that is processed for monitoring a KPI, and the like.

Network operators that coordinate and deploy communication networks that include network services (e.g., hardware, software, etc.) that are provided by one or more network service providers are reliant on system data supplied to the network operator by the one or more network service providers for monitoring KPIs. Each network service provider often uses a corresponding monitoring system to monitor performance of the network service(s) provided by that network service provider to gather various system data (e.g., raw data, processed data, and/or pre-processed data provided by a network service provider's monitoring system, pre-processed KPI data provided by the network service providers, etc.) usable by the network operator for determining KPI values indicative of the state of the communication network. The network service providers send the system data to the network operator for monitoring the status of the communication network in consideration of the system data associated with the network service(s) provided by each network service provider. For example, the network operator uses the system data supplied by the network service providers to generate KPI value(s) and/or to evaluate the quality of services provided by each of the network service providers.

Prior to sending the system data, the network service providers and the network operators often agree regarding how each network service provider's monitoring system will send the system data to the network operator, and how frequently the system data will be sent.

The system data is sometimes sent by the network service providers as raw data, or at least in some pre-processed format from the network service providers to the network operator. Upon receipt, the network operator reviews the system data and categorizes the system data before storing to the system data in a database for access by a user in charge of monitoring various KPIs associated with the network service and/or the communication network. When a network service provider wants to add or update system data, the network service provider usually contacts one or more individuals or members of specific team(s) at the network operator (e.g., engineering team, network monitoring team, etc.) and informs the appropriate member(s) of the network operator regarding the schedule of the addition and/or provision of new system data. The one or more individuals or members of the specific team(s) then need to be prepared to receive the new system data according to the informed schedule, so that the new system data will be sent by the network service provider wanting to add new system data by way of email, ems, etc. is received. After receiving the new system data from the network service providers, the one or more individuals or members of the specific team(s) at the network operator are then tasked with personally reviewing, approving, classifying, and storing the new system data to a centralized data storage controlled by the network operator for facilitating the monitoring of one or more KPIs based on the new system data.

The conventional approach to providing system data to network operators for KPI monitoring is unduly burdensome for the network service providers and/or the network operator.

For example, the network service providers need to work closely with the one or more individuals and/or the members of the specific team(s) at the network operator. It is sometimes difficult to continuously or immediately communicate with certain individuals and/or members of specific team(s) at the network operator, particularly when a network service provider needs to send urgent data (e.g., an urgent software update, etc.) to the network operator. In some embodiments, per conventional system data provision agreements, the network service providers cannot provide the system data to the network operator before or after the agreed upon time. For example, if a network service provider needs to send the system data earlier or later for some reason, the network service provider needs to contact the certain individual(s) and/or members of the specific team(s) at the network operator before doing so, making urgent and/or rescheduled sending of system data.

Furthermore, when the communication of system data is normally handled by a specific individual, whether on the network service provider side or on the network operator side, it is difficult for a new member to take over the communications from person in charge, or for a specific person to always be available on-demand for the sending and/or receiving of system data. As a result, it is very burdensome for the person in charge, especially when that person is in-charge of sending and/or receiving and/or monitoring multiple KPIs and/or multiple sources or types of system data.

In addition to the burdens associated with sending and/or receiving system data, sometimes data loss and/or delay in data updates may occur due to miscommunication between network service providers and the one or more individuals or members of the specific team(s) at the network operator. For example, consider a situation in which a network service provider wants to update some system data by 9:00 AM on a Monday, but the network service provider forgot to inform the specific team(s) at the network operator. As a result, even if the network service provider sent the data by 9:00 AM on Monday, since the specific team(s) may not have been aware of the provision of the system data, the specific team(s) may not be able to update the system data with the newly received system data in time for the intended usage of the new system data. As another example, consider a situation in which the specific team(s) receive communications from multiple network service providers and/or regarding multiple services, and the specific team(s) accidentally update the system data with an incorrect set of system data that corresponds with a different service provider or a different network service. In such case, the original system data may be lost, or the incorrect updating of the system data may go unnoticed, and the KPIs being monitored that are believed by the network operator to be corresponding to the system data will be erroneous.

Sometimes, the network service providers and/or the one or more individuals or member(s) of the specific team(s) at the network operator (e.g., end users, person in charge of monitoring the network status, person who will use the received system data, etc.) do not know which system data has been successfully received, when such system data has been successfully received, and/or which or when such system data has been stored in the data storage. This lack of transparency is often problematic for network service providers and network operators. For example, since the system data being stored in the centralized data storage may contain confidential data, the network service providers and users at the network operator do not have visibility regarding what system data has been stored in the data storage. Accordingly, it is difficult for the network service providers to ensure that the provided system data has been successfully received and stored. For example, even if a network service provider has provided data for updating a software version, the network service provider will not have any idea as to whether such data has been stored in the network operator's data storage. Moreover, if the system data has not been stored, the user at the network operator and/or specific team(s) will not be able to update the central data storage with the new system data.

Network operators consistently check KPIs, for example, to ensure validity and stability of the communication network. Then, based on a determination that an anomaly occurs in one or more KPIs, take an appropriate action such as making a change in network service providers or network devices that are used to provide one or more network services that are malfunctioning to one or more alternative network service providers and/or one or more alternative network devices to ensure the communication network is operating and available for consumers. Similarly, predicting anomalies in the KPIs is useful for pre-empting a potential issue in the operation of the communication network. Thus, ensuring that the system data is easily updated by network service providers and recognized as being added to the central data storage by one or more of the network service providers and/or the network operator is increasingly valuable to the network service providers and/or the network operator.

Communication networks often involve network services across multiple domains such as radio area network (RAN), base station subsystem (BSS), platform, core network, etc., various technologies (such as 3G, 4G, LTE, 5G, etc.), multiple locations, various software interfaces, multiple devices, etc. that are proprietary and/or optimized by a specific network service provider.

As the communication network evolves and improves, a single communication network may involve an ever-changing quantity of network service providers for providing network services and/or that are associated with providing network services associated with various aspects of the communication network (e.g., domains, technologies, locations of services, etc.) and, as a result, the state of the communication network may vary dynamically with the addition and/or subtraction of network service providers, a change in one or more network services, etc. Furthermore, it is cumbersome for a network operator to continually change, update and track contact information with the various network service providers for purposes of receiving system data. Accordingly, monitoring the operating state of the communication network based on system data provided by multiple network service providers becomes more challenging.

FIG. 1 is a diagram of a KPI monitoring and centralized data storage system 100, in accordance with one or more embodiments.

System 100 makes it possible for a network service provider to directly send the system data to the network operator while reducing the need for one or more individuals and/or member(s) of specific team(s) at the network operator to be involved in such sending/receiving/sorting/storing procedures. System 100 also provides improved transparency into what system data is stored and available for monitoring KPIs associated with a communication network provided by the network operator. Additionally, the system 100 makes it possible for network service providers to specify how the system data is to be provided to the network operator. Furthermore, the system 100 makes it possible for network operators and/or network service providers to access and view the system data in a central repository provided by the network operators, and/or as categorized and sorted for storage in the central repository for easy recognition and monitoring by the network operator and/or the network service providers.

System 100 comprises a network management platform 101, a central repository 103, one or more network devices 105a-105n (collectively referred to as network devices 105), and one or more user equipment (UE) 107a-107n (collectively referred to as UE 107). The network management platform 101, the central repository 103, the one or more network devices 105, and/or the one or more user equipment (UE) 107 are communicatively coupled by way of a communication network 111. In some embodiments, the communication network 111 is orchestrated by the network management platform 101 which combines a plurality of network services provided by a network service provider via the network devices 105. In some embodiments, the network management platform 101 is a network orchestrator that implements the communication network 111. In some embodiments, the network management platform 101 is a portion of a network orchestrator that implements the communication network 111.

The network service providers associated with the network services provided have corresponding network service provider monitoring systems 109a-109n (collectively referred to as network service provider monitoring system 109). The network service provider monitoring systems 109 collect system data associated with the network services provided to communication network 111 and send that system data to the network management platform 101 to facilitate monitoring of the state of the communication network 111.

In some embodiments, network management platform 101 comprises a set of computer readable instructions that, when executed by a processor such as a processor 903 (FIG. 9), causes network management platform 101 to perform the processes discussed in accordance with one or more embodiments. In some embodiments, network management platform 101 is remote from the network devices 105. In some embodiments, network management platform 101 is a part of one or more of the network devices 105. In some embodiments, one or more processes the network management platform 101 is configured to perform is divided among one or more of the network devices 105 and a processor remote from the network devices 105. In some embodiments, the network management platform 101 is at least partially implemented by a UE 107.

In some embodiments, central repository 103 has searchable information stored therein that includes stored system data, rules defining various KPIs, network functions capable of being implemented in the network involving one or more of network usage, timing, connected devices, location, network resource consumption, cost data, example network KPIs, KPI monitoring profiles corresponding to one or more users, KPI evaluation profiles corresponding to one or more users, other suitable elements or information, or a combination thereof. Central repository 103 is a memory such as a memory 905 (FIG. 9) capable of being queried or caused to store data in accordance with one or more embodiments. In some embodiments, the network management platform 101 and the central repository 103 together form a network orchestrator that implements the communication network 111.

In some embodiments, network management platform 101 generates a graphical user interface that is output to a display by way of a UE 107 or a terminal associated with network management platform 101 for a user (e.g., a network operator, a network administrator, and any personnel which would like to or is responsible to monitor the state of the communication network 111), so as to allow the user to monitor the operating state of the communication network 111. In some embodiments, the user interface is accessible via a web browser such as by way of a website or a web browser plug-in.

The network service provider monitoring system(s) 109 of each of the plurality of network service providers continuously monitor their own corresponding network services and periodically send at predetermined times (e.g., every 5 minutes, every 15 minutes, every 30 minutes, etc.) the monitored system data to the network management platform 101. In some embodiments, the network management platform 101 causes the monitored system data to be stored in the central repository 103. In some embodiments, the central repository 103 is controlled by the network operator.

The system data is communicated from the network service provider monitoring systems 109 to the network management platform 101 via one or more of a wireless communication channel, a wired communication channel, enhanced messaging service (EMS), email messaging, data packet transmission, or some other suitable type of data transmission which is optionally the same or different among the plurality of network service providers.

In some embodiments, the network management platform 101 continuously monitors the system data received from the network service provider monitoring system(s) 109 by processing received system data that is stored in the central repository 103.

In some embodiments, when a user (e.g., a network operator, a network service provider, and/or any personnel that would like to or is responsible to monitor the system) wants to monitor one or more KPIs, view stored system data, and/or update or send system data, the network management platform 101 makes it possible for a user to access to the centralized platform via a UE 107. The network management platform 101 determines the identity of the user based on user credentials, access device, or some other suitable manner, and provides a graphical user interface to the user via a UE 107. In some embodiments, the network management platform 101 limits functions available to the user by way of the graphical user interface depending on the type of user (e.g., a regular user may have access to fewer functions than a VIP user, a network administrator may have access to all functions, etc.).

System 100 makes it possible to gather system data regarding and/or from multiple network service providers, multiple domains, multiple technologies, multiple locations, or a combination thereof. In some embodiments, the system 100 makes it possible for stored system data to be viewable by the related parties (e.g., network service providers, network operator, end users, etc.), and to provide a graphical user interface that enables the various network service providers to specify how system data should be added/provided to the network operator any time the network service provider(s) want to add/provide system data to the network operator.

The system 100 facilitates the various network service providers to input parameters based upon which the network management platform 101 will automatically receive, categorize, and store the system data in the central repository 103. After the system data is successfully stored in the central repository 103, the network management platform 101 causes the graphical user interface to present a list containing details of the system data. In some embodiments, the list of the system data is accessible to all parties associated with providing and viewing the system data. In some embodiments, the list of the system data is accessible by all related parties in accordance with corresponding accessibility permissions assigned to user credentials identifying each of the parties associated with providing and/or viewing the system data.

In some embodiments, the system 100 is a centralized data sorting and storing system, wherein the network service providers can directly send the system data to the network management platform 101 without requiring intermediary communications with the specific individuals or specific team(s) of the network operator. In the meantime, the system 100 enables the specific individuals and/or specific team(s) of the network operator to still have access to the storing history (e.g., the network operator can still see what system data the network service providers have sent to the network management platform 101). Accordingly, the system 100 reduces the burden of network operator in managing and storing the system data, while still maintaining the visibility of the system data provided by the network service providers.

The system 100 enables the network service providers to provide the system data to the network management platform 101 whenever the network service provider is required to do so, and the network management platform 101 automatically and appropriately sorts and stores the system data in the central repository 103. All authorized parties (i.e., the network service providers, the specific individuals and/or the specific team(s) of the network operator, specific end users, etc.) have visibility regarding the stored system data and various details associated with the store system data (e.g., when a software version is updated, which system data required for calculating a specific KPI is missing, etc.). Accordingly, the system 100 provides high efficiency in system data management, improves user flexibility, improves transparency of the stored system data, avoids data loss due to miscommunication between the network service providers and the network operator, reducing the burdens associated with providing, managing and storing system data for both the network service providers and the network operator.

In use, when a network service provider wants to send system data to the network operator, the network service provider accesses the network management platform 101 by way of the network service provider's terminal (e.g., a UE 107 having connectivity to the communication network 111).

After authentication and authorization based on receiving and processing user credentials (e.g., user ID and password, etc.), the network management platform 101 retrieves a user profile of the network service provider (e.g., which may be stored in the central repository 103 or some other suitable memory or database having connectivity to system 100), accesses the central repository 103 to determine (based on the user profile) which stored system data is related to the network service provider, and then generates and presents a list of the stored system data by way of the graphical user interface based on the determined stored system data related to the network service provider. In some embodiments, the list includes details of the stored system data comprising library, group, category and/or other suitable information regarding the stored system data based on the determined stored system data related to the network service provider. In some embodiments, the library/group/category information included in the list further comprises information of the stored system data with which the stored system data is associated. For example, a plurality of system data may fall under a counter group A, a counter group B, etc.

In some embodiments, if the network service provider wants to add system data which is correlated to stored system data (e.g., if the network service provider wants to update or add more system data to the stored system data), the network service provider may duplicate/reuse a preexisting configuration profile previously generated for the stored system data as a template. For example, the network service provider may trigger a functional element on the graphical user interface (e.g., pressing a "+" button, pressing shortcut key(s), etc.), and the network management platform 101 will generate another graphical user interface to enable the network service provider to add the new system data.

In some embodiments, if the network service provider wants to add new system data, the network service provider can optionally trigger a functional element on the graphical user interface (e.g., pressing a "+" button, pressing shortcut key(s), etc.) and, in response the network management platform 101 generates and causes another graphical user interface to be displayed to enable the user to define a new library, group, and/or category for the new system data. In some embodiments, the graphical user interface for defining a new library, group and/or category comprises various input fields for receiving information indicating user-selected parameters. In some embodiments, the various input fields are configured to receive information regarding options comprising a selected domain, a selected network service provider, a selected network node, a selected technology, or some other suitable option. In some embodiments, the graphical user interface for defining a new library, group and/or category comprises a bulk data input region configured to receive the system data in bulk by way of a drag and drop operation indicating that selected file(s) are moved/copied from a file directory and uploaded to the network management platform 101 by dropping the selected file(s) into the input region. In some embodiments, the graphical user interface comprises an upload icon for uploading one or more files from a file directory. The network management platform 101 then automatically scans through the bulk data to identify the system data contained in the bulk data, appropriately sorts the bulk data (e.g., based on the node, technology, etc.), to create categories for storing system data in the central repository 103.

In some embodiments, the graphical user interface for defining a new library, group and/or category comprises one or more additional parameter input fields for receiving information associated with the system data. In some embodiments, one or more of the parameter input fields for receiving information associated with the system data is indicated as being a required input field that is populated before proceeding with adding the new system data and/or before creating a configuration profile defining how the system data is to be provided by the network service provider. In some embodiments, after the network service provider has specified all required fields, the network management platform 101 updates the list in the graphical user interface to include the new library, group, and/or category of the new system data. The network service provider can then view the new library, group, and/or category and add new system data from the list view.

In some embodiments, after the system data is successfully stored in the central repository, the network management platform 101 sends a notification (e.g., by way of email, SMS, push-notification, or some other suitable messaging protocol) to inform the associated parties (e.g., the network service provider, specific individual(s) the specific team(s) of the network operator, the end user, etc.) that the system data has successfully been stored in the central repository 103.

Similar to network service providers, the specific individual(s) of the network operator, specific team(s) of the network operator and/or the authorized end user(s) can access the central repository 103 by way of a corresponding terminal having connectivity to the communication network such as a UE 107 of the individual(s), specific teams(s) and/or authorized end user(s), and the network management platform 101 generates and causes a graphical user interface to be displayed containing the list of library and/or group associated with the user accessing the central repository 103. In some embodiments, the list includes information comprising one or more of the time which the system data was received from the network service providers and/or stored in the central repository 103, the user and/or network service provider name that provided the system data, the user who modified and/or updated the system data, or some other suitable information. In some embodiments, the specific individual(s) and/or team(s) of the network operator and/or the authorized end user may modify (e.g., update, edit, delete, etc.) the stored system data by way of the graphical user interface, and the network management platform 101 records the action and sends a notification to the network service provider. In some embodiments, all actions (e.g., receiving, storing, editing, updating, etc.) of the system data are automatically recorded by the network management platform 101, and all associated users will be notified by way of a notification message sent by the network management platform 101 indicating one or more of the receipt, storage, editing, etc. of the system data.

Figure 2:
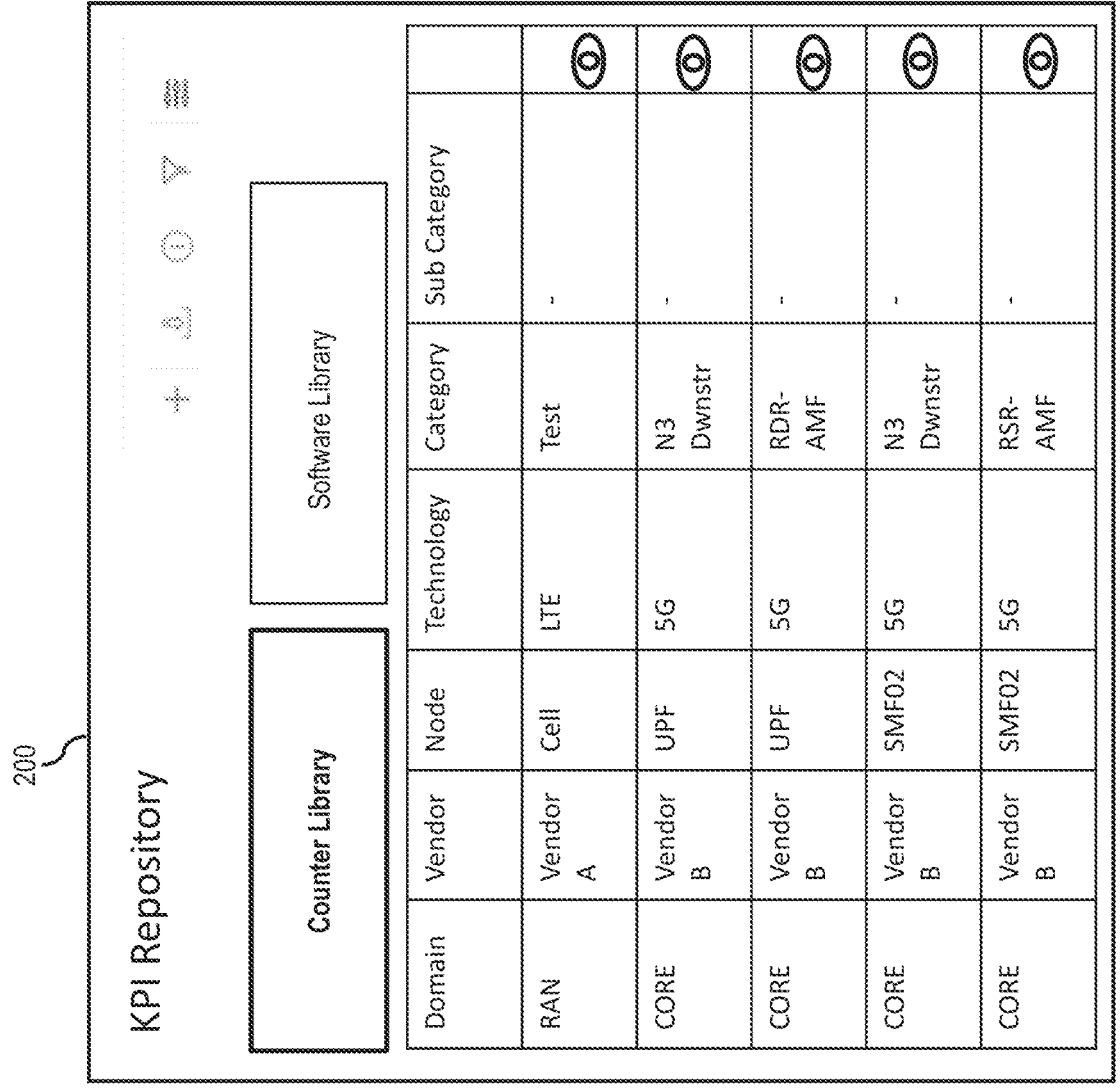
FIG. 2 is a diagram of a graphical user interface, in accordance with one or more embodiments.

FIG. 2 is a diagram of a graphical user interface 200, in accordance with one or more embodiments. Network management platform 101 is configured to cause graphical user interface 200 to be output to a display.

Graphical user interface 200 is a KPI repository interface that includes two options for viewing stored system data. A first option is a counter library view, and a second option is a software library view. Graphical user interface 200 facilitates selecting one of the counter library view or the software library view for display. Graphical user interface 200 is shown in FIG. 2 as having the counter library view selected. The stored system data shown in the counter library view includes the counter data for generating and storing the system data. In this example, the counter library view includes information corresponding to domain, vendor (e.g., network service provider name), node, technology, category (e.g., category of the counter, etc.) and sub-category. In some embodiments, additional information is optionally included, lesser information is optionally included, or combinations thereof is included.

In some embodiments, the counter library view hosts a complete list of performance counters for all vendors, technologies and domains. In some embodiments, the counters are used to create KPIs in a KPI builder module.

Graphical user interface 200 includes a customized list option that enables a user to add or remove columns from the counter library view. In some embodiments, the customized list option is selected by way of a slider icon or some other suitable user interface widget. In some embodiments, the customized list option is excluded or provides alternative functionalities associated with modifying the information provided in the counter library view.

Graphical user interface 200 includes a filter option that enables a user to filter and/or sort the information included in the counter library view based on one or more of domain, vendor, node, technology, category, sub-category, or other column heading/information included in the counter library view. In some embodiments, the filter option is excluded from the counter library view.

Graphical user interface 200 includes a library field information icon that facilitates viewing of the information included in the counter library view. In some embodiments, the information icon is an "i" surrounded by a circle (as illustrated in FIG. 2) or some other suitable user interface widget. In some embodiments, the information icon is excluded from the counter library view.

Graphical user interface 200 includes a download option icon that enables a user to trigger a download of the counter library to a user terminal such as a UE 107. In some embodiments, the download icon is a down-facing arrow (as illustrated in FIG. 2) or some other suitable user interface widget. In some embodiments, the download option is excluded from the counter library view.

Graphical user interface 200 includes an option to add new counters by selecting the plus sign "+" (as illustrated in FIG. 2) or some other suitable user interface widget. Once a new counter is added, the new counter will be added to the list included in the counter library view.

Graphical user interface 200 includes an option to view more specific details of a corresponding counter. In user interface 200, the option to view more specific details of a corresponding counter is an eye-ball icon or some other suitable user interface widget. In some embodiments, the option to view more specific details of a corresponding counter is excluded from the counter library view.

Figure 3:
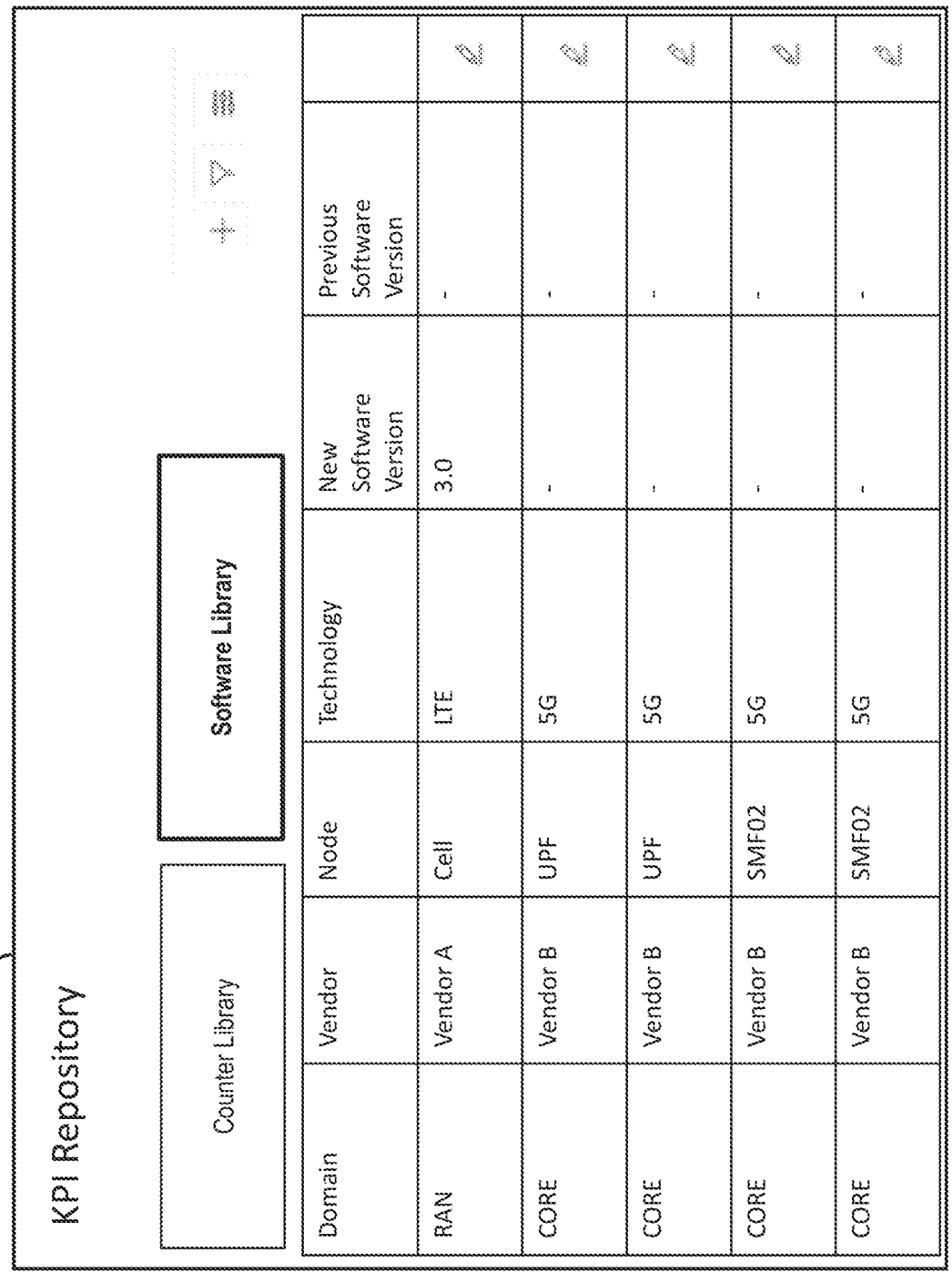
FIG. 3 is a diagram of a graphical user interface, in accordance with one or more embodiments.

FIG. 3 is a diagram of a graphical user interface 300, in accordance with one or more embodiments. Network management platform 101 is configured to cause graphical user interface 300 to be output to a display.

Graphical user interface 300 is a software library view of the KPI repository interface (that includes two options for viewing stored system data). The first option, as discussed above, is the counter library view. The second option, as discussed above and as illustrated in FIG. 3, is the software library view. Graphical user interface 300 facilitates selecting one of the counter library view or the software library view for display. Graphical user interface 300 is shown in FIG. 3 as having the software library view selected. The stored system data shown in the software view includes information for defining the software version. In this example, the software library view includes information corresponding to domain, vendor (e.g., network service provider name), node, technology, new software version and previous software version. In some embodiments, additional information is optionally included, lesser information is optionally included, or combinations thereof is included.

In some embodiments, the software library view is a KPI repository that provides a complete list of all the software versions for all vendors, technologies and domains that are in use or available to be used by the various network service providers to provide corresponding network services. In some embodiments, the information included in the software library view is usable to create KPIs in a KPI builder module.

Graphical user interface 300 includes an option to add new software versions by selecting the plus sign "+" (as illustrated in FIG. 3) or some other suitable user interface widget. Once a new software version is added, the new software version will be shown in the new software version column and all the remaining software versions will be shown in the previous software version column.

Graphical user interface 300 includes a customized list option that enables a user to add or remove columns from the software library view. In some embodiments, the customized list option is selected by way of the slider icon or some other suitable user interface widget. In some embodiments, the customized list option is excluded or provides alternative functionalities associated with modifying the information provided in the counter library view.

Graphical user interface 300 includes a filter option that enables a user to filter and/or sort the information included in the software library view based on one or more of domain, vendor, node, technology, new software version, pervious software version, or other column heading/information included in the software library view. In some embodiments, the filter option is excluded from the software library view.

Graphical user interface 300 includes an edit option that enables a user to selectively edit a selected counter in the software library view by selecting an edit icon. In some embodiments, the edit icon is a pencil (as illustrated in FIG. 3), word-link, or some other suitable user interface widget. In some embodiments, the filter option is excluded from the software library view.

FIG. 4 is a diagram of a graphical user interface 400, in accordance with one or more embodiments. Network management platform 101 is configured to cause graphical user interface 400 to be output to a display.

Graphical user interface 400 is a counter view of the information associated with a selected counter in the counter library view shown in graphical user interface 200 after a user triggers the option to view more specific details of a corresponding counter in graphical user interface 200. Information included in graphical user interface 400 regarding the selected counter comprises one or more of a measurement name, a measurement ID, Mo Name, Counter ID, Counter Name, Release, Counter Type, Sub-Category, Time Aggregation, Node Aggregation, Unit, Trigger Type, Sampling Interval, Range, Description, Updated Description, or some other suitable details having been entered and/or detected or assigned by network management platform to the selected counter. In some embodiments, at least some of the information is user-added when the counter is created by way of, for example, user interface 500 (FIG. 5).

Graphical user interface 400 includes a download option icon that enables a user to trigger a download of the counter shown in graphical user interface 400 to a user terminal such as a UE 107. In some embodiments, the download icon is a down-facing arrow or some other suitable user interface widget. In some embodiments, the download option is excluded from the counter view shown in FIG. 4.

Graphical user interface 400 includes an option to add new counters by selecting the plus sign "+" or some other suitable user interface widget. Once a new counter is added, the new counter will be added to the list included in the counter library view.

Graphical user interface 400 includes a customized list option that enables a user to add or remove columns from the counter view. In some embodiments, the customized list option is selected by way of a slider icon or some other suitable user interface widget. In some embodiments, the customized list option is excluded or provides alternative functionalities associated with modifying the information provided in the counter library view.

FIG. 5 is a diagram of a graphical user interface 500, in accordance with one or more embodiments. Network management platform 101 is configured to cause graphical user interface 500 to be output to a display.

Graphical user interface 500 is displayed based on a user triggering the add counter option in graphical user interface 400. Graphical user interface 500 includes input fields 501a-501r configured to receive user inputs for measurement name, a measurement ID, Mo Name, Counter ID, Counter Name, Release, Counter Type, Sub-Category, Time Aggregation, Node Aggregation, Unit, Trigger Type, Sampling Interval, Range, Description, Updated Description, or some other suitable details. In some embodiments, a quantity of the user interface fields 501 less than a total quantity of the user interface fields 501 are required by network management platform 101 for creating a new counter. In this example, counter name in view input field 501f and counter type input field 501h are required, as indicated by the solid lines surrounding each input field. In some embodiments, other indicators such as stars, colored field, or other suitable distinguisher may be used. The other input fields 501a-501e, 501g and 501i-501r are optional input fields, as indicated by the dashed lines surrounding the optional input fields. In some embodiments, the optional input fields may be identified by color, grayed out, lack of a star versus having a star in the required input fields, or by some other suitable distinguisher.

If, for example, the network service provider wants to add system data which is correlated to stored system data (e.g., if the network service provider wants to update or add more system data to the stored system data), the network service provider may duplicate/reuse a configuration profile previously generated for the stored system data (e.g., by selecting the "+" in graphical user interface 400), which would pre-populate the input fields (e.g., one or more of input fields 501a-501r) based on the information included in the counter shown in graphical user interface 400. For example, the network service provider may trigger a functional element in the graphical user interface 400 (e.g., pressing a "+" button, pressing shortcut key(s), etc.), and the network management platform 101 will generate graphical user interface 500 to enable the network service provider to simply add the new system data.

Figure 6:
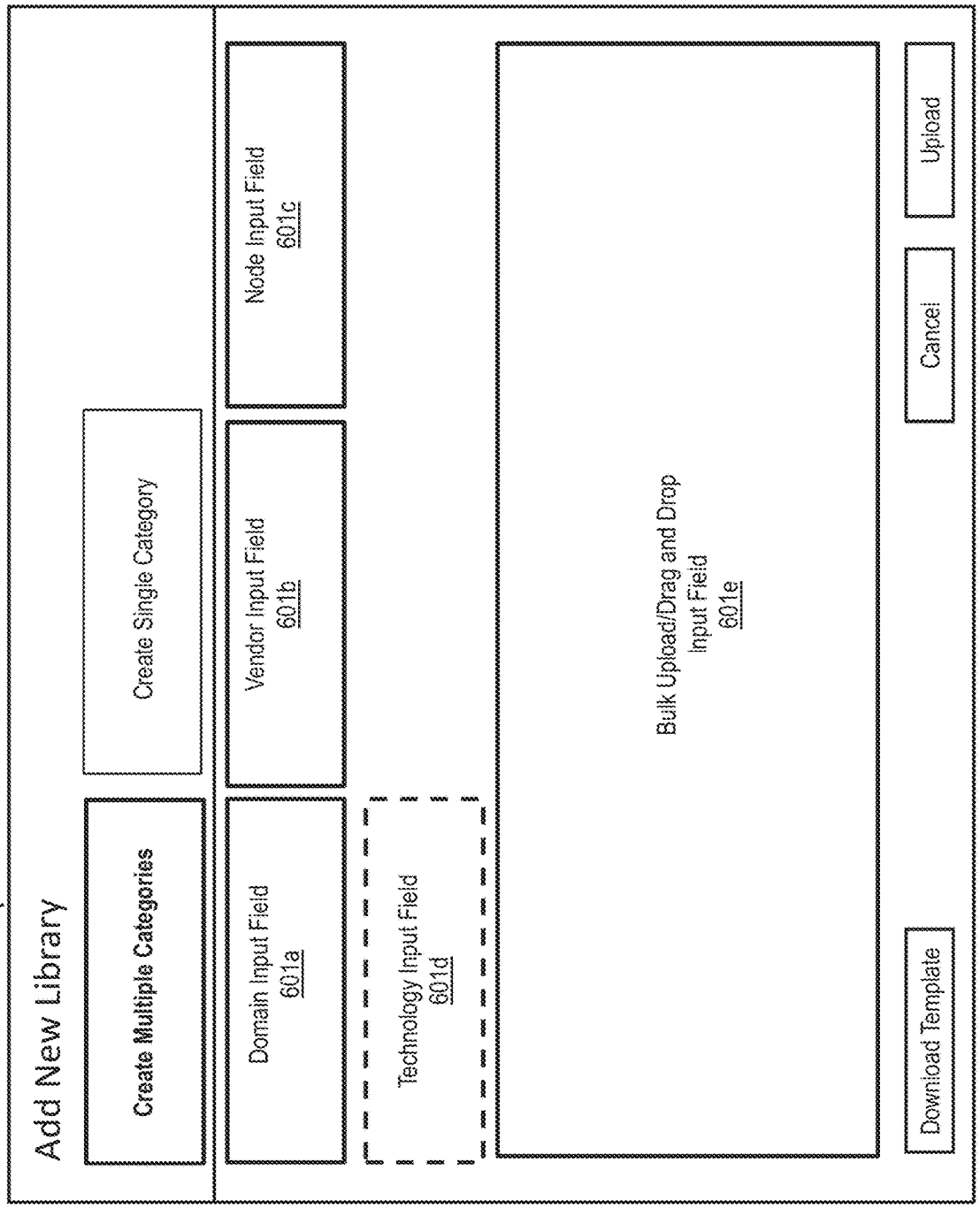
FIG. 6 is a diagram of a graphical user interface, in accordance with one or more embodiments.

FIG. 6 is a diagram of a graphical user interface 600, in accordance with one or more embodiments. Network management platform 101 is configured to cause graphical user interface 600 to be output to a display.

Graphical user interface 600 is displayed based on a user triggering the add counter library option in graphical user interface 200 or add software library option in graphical user interface 300. Graphical user interface 600 includes two options for adding a new counter library to the counter library. A first option is an option to create multiple categories at once (e.g., bulk addition option), and a second option is an option to create one category. Graphical user interface 600 facilitates selecting one of the bulk addition option or the manual input option for display. Graphical user interface 600 is shown in FIG. 6 as having the create multiple categories option selected.

Graphical user interface 600 includes input fields 601a-601d configured to receive user inputs for domain, vendor (e.g., network service provider name), node, and technology. In some embodiments, graphical user interface 600 includes optional input fields for some other suitable details. Graphical user interface 600 also includes a bulk upload/drag and drop input field 601e.

Graphical user interface 600 enables a user to only specify domain, vendor and node, and optionally, technology. In some embodiments, alternative combinations of input fields for optional and/or required input fields may be identified as being required for creating a new counter for inclusion in the counter library. The bulk upload/drag and drop input field 601e is configured to facilitate simple upload of the system data in bulk (via drag-drop to the input window, choosing particular bulk data (e.g., excel, csv, etc.) from a file directory, etc.). The network management platform 101 then automatically scans through the bulk data to identify the system data contained in the bulk data, appropriately sorts the bulk data (e.g., based on the node, technology, etc.), and creates multiple categories for inclusion in the counter library.

After the user (e.g., a vendor, a service provider, a member from the network operator, etc.) has specified all required fields, and optionally one or more of the optional input fields, the network management platform 101 updates the list in graphical user interface 200 to include the new library/group/category of the new system data.

FIG. 7 is a diagram of a graphical user interface 600, in accordance with one or more embodiments. Network management platform 101 is configured to cause graphical user interface 700 to be output to a display.

Graphical user interface 700 is displayed based on a user triggering the add counter option in graphical user interface 200. Graphical user interface 700 includes two options for adding a new counter to the counter library. The first option is the create multiple categories option, and the second option is the create single category option. Graphical user interface 700 facilitates selecting one of the create multiple categories option or the create single category option. Graphical user interface 700 is shown in FIG. 7 as having the manual input option selected.

Graphical user interface 700 includes input fields 701a-701g configured to receive user inputs for domain, vendor (e.g., network service provider name), node, technology, software version, category name, and measurement ID. In some embodiments, graphical user interface 700 includes input fields for some other suitable details.

Graphical user interface 700 enables a user to only specify domain, vendor, node, and category name. The other input fields in this example embodiment are optional. In some embodiments, alternative combinations of input fields for optional and/or required input fields may be identified as being required for creating a new counter for inclusion in the list shown in graphical user interface 200.

After the vendor has specified all required fields, and optionally one or more of the optional input fields, the network management platform 101 updates the list in graphical user interface 200 to include the new library/group/category of the new system data.

Figure 8:
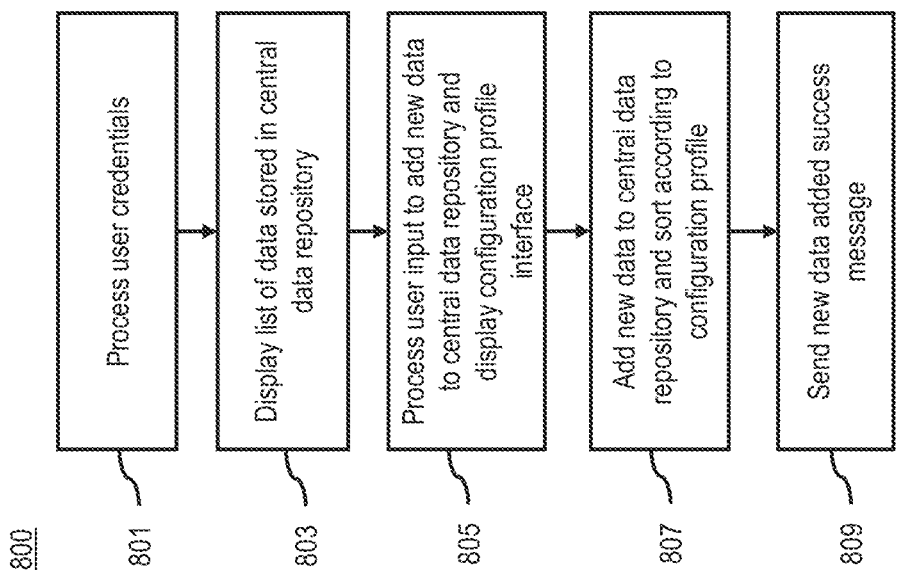
FIG. 8 is a flowchart of a process for storing system data in a central repository, in accordance with one or more embodiments.

FIG. 8 is a flowchart of a process 800 for storing system data in a central repository, in accordance with one or more embodiments. In some embodiments, the network management platform 101 (FIG. 1) performs the process 800.

In step 801, user credentials received by way of a graphical user interface output by a display are processed to facilitate retrieving a user profile associated with the user credentials from a database and accessing a central repository to retrieve stored data based on the user profile.

In step 803, a list of the stored data corresponding to the user profile is caused to be displayed by way of the graphical user interface. The stored data is displayed according to a plurality of sortable parameters indicative of the stored data included in the list. In some embodiments, the list of the stored data included in the graphical user interface is limited based on the received user credentials being associated with selected service provider to only the stored data associated to the selected service provider (e.g., stored data received by the central repository from the selected service provider, etc.). In some embodiments, all of the stored data in the central repository is caused to be viewable by way of the graphical user interface based on the received user credentials associated with the network operator.

In step 805, a user input received by way of the graphical user interface is processed to add new data to the central repository and cause a configuration profile user interface to be output by the display. The configuration profile user interface comprises a plurality of parameter input fields configured to receive information identifying a selected wireless domain of a plurality of wireless domains, a selected service provider of a plurality of service providers associated with providing a network service to a communication network, and a selected network node of a plurality of network nodes.

In some embodiments, the plurality of parameter input fields are further configured to receive information identifying a selected wireless technology of a plurality of wireless technologies associated with the network service, a selected time interval for providing the new data to the central repository, a category name, and a software version. In some embodiments, the plurality of parameter input fields are further configured to receive information identifying a counter identifier, a counter name, a release number, a counter type, a sampling interval, and a trigger type.

In some embodiments, at least three of the plurality of parameter input fields are identified in the configuration profile user interface as required input fields based on one or more of the software version and a selected manner for receiving the new data, and the apparatus is further caused to prevent the new data from being received unless the required input fields are populated with the information each of the required input fields are configured to receive.

In some embodiments, the configuration profile user interface comprises a bulk data input field configured to receive one or more data files by way of a drag and drop operation and/or a file directory upload option. In some embodiments, a category is caused to be included in the list of the stored data based on a scanning and processing of the one or more data files received by way of the bulk data input field.

In step 807, the new data is caused to be added to the central repository and sorted according to a generated configuration profile based on the information received by way of the plurality of parameter input fields.

In step 809, a new data added success message is caused to be sent to at least one of a user associated with the user credentials or a network operator having access to the list of the stored data.

Figure 9:
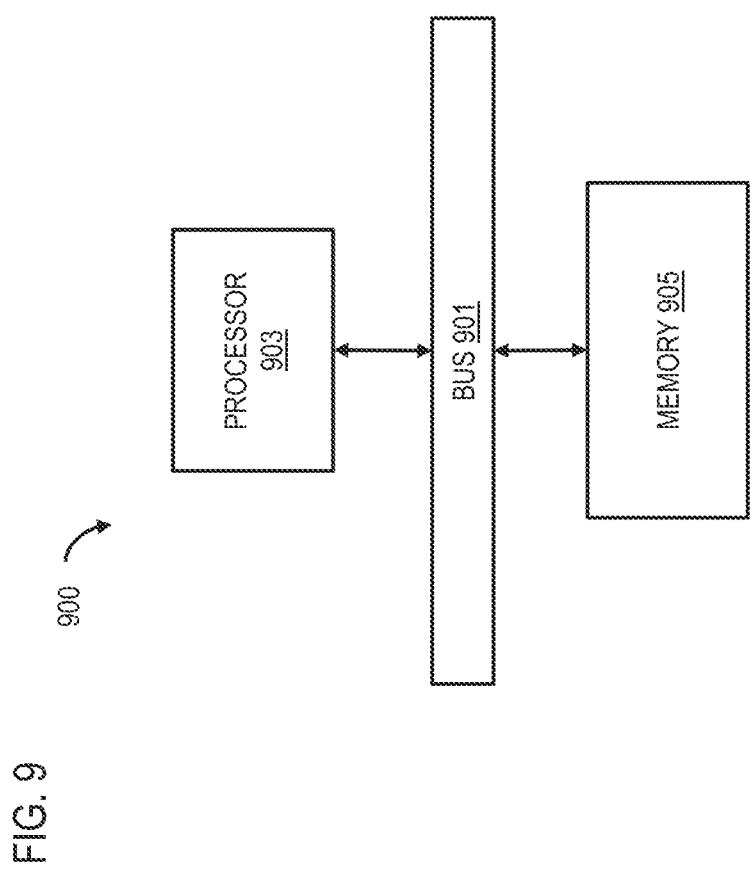
FIG. 9 is a functional block diagram of a computer or processor-based system upon which or by which an embodiment is implemented.

FIG. 9 is a functional block diagram of a computer or processor-based system 900 upon which or by which an embodiment is implemented.

Processor-based system 900 is programmed to facilitate storing system data in a central repository, as described herein, and includes, for example, bus 901, processor 903, and memory 905 components.

In some embodiments, the processor-based system is implemented as a single "system on a chip." Processor-based system 900, or a portion thereof, constitutes a mechanism for performing one or more steps of facilitating storing system data in a central repository.

In some embodiments, the processor-based system 900 includes a communication mechanism such as bus 901 for transferring and/or receiving information and/or instructions among the components of the processor-based system 900. Processor 903 is connected to the bus 901 to obtain instructions for execution and process information stored in, for example, the memory 905. In some embodiments, the processor 903 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 903. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 903 performs a set of operations on information as specified by a set of instructions stored in memory 905 related to facilitating storing system data in a central repository. The execution of the instructions causes the processor to perform specified functions.

The processor 903 and accompanying components are connected to the memory 905 via the bus 901. The memory 905 includes one or more of dynamic memory (e.g., RAM, magnetic disk, writable optical disk, etc.) and static memory (e.g., ROM, CD-ROM, etc.) for storing executable instructions that when executed perform the steps described herein to facilitate storing system data in a central repository. The memory 905 also stores the data associated with or generated by the execution of the steps.

In one or more embodiments, the memory 905, such as a random access memory (RAM) or any other dynamic storage device, stores information including processor instructions for storing system data in a central repository. Dynamic memory allows information stored therein to be changed. RAM allows a unit of information stored at a location called a memory address to be stored and retrieved independently of information at neighboring addresses. The memory 905 is also used by the processor 903 to store temporary values during execution of processor instructions. In various embodiments, the memory 905 is a read only memory (ROM) or any other static storage device coupled to the bus 901 for storing static information, including instructions, that is not capable of being changed by processor 903. Some memory is composed of volatile storage that loses the information stored thereon when power is lost. In some embodiments, the memory 905 is a non-volatile (persistent) storage device, such as a magnetic disk, optical disk or flash card, for storing information, including instructions, that persists even when the system 900 is turned off or otherwise loses power.

The term "computer-readable medium" as used herein refers to any medium that participates in providing information to processor 903, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to an apparatus comprising a processor and a memory. The memory has instructions stored thereon that, when executed by the processor, cause the apparatus to process user credentials received by way of a graphical user interface output by a display, retrieve a user profile associated with the user credentials from a database, and access a central repository to retrieve stored data based on the user profile. The apparatus is also caused to cause a list of the stored data corresponding to the user profile to be displayed by way of the graphical user interface. The stored data is displayed according to a plurality of sortable parameters indicative of the stored data included in the list. The apparatus is also caused to process a user input received by way of the graphical user interface to add new data to the central repository and cause a configuration profile user interface to be output by the display. The configuration profile user interface comprises a plurality of parameter input fields configured to receive information identifying a selected wireless domain of a plurality of wireless domains, a selected service provider of a plurality of service providers associated with providing a network service to a communication network, and a selected network node of a plurality of network nodes. The apparatus is also caused to cause the new data to be added to the central repository and sorted according to a generated configuration profile based on the information received by way of the plurality of parameter input fields. The apparatus is also caused to cause a new data added success message to be sent to at least one of a user associated with the user credentials or a network operator having access to the list of the stored data.

Another aspect of this description is related to method comprising processing, by a processor, user credentials received by way of a graphical user interface output by a display to facilitate retrieving a user profile associated with the user credentials from a database and accessing a central repository to retrieve stored data based on the user profile. The method also comprises causing a list of the stored data corresponding to the user profile to be displayed by way of the graphical user interface. The stored data is displayed according to a plurality of sortable parameters indicative of the stored data included in the list. The method also comprises processing a user input received by way of the graphical user interface to add new data to the central repository and cause a configuration profile user interface to be output by the display. The configuration profile user interface comprises a plurality of parameter input fields configured to receive information identifying a selected wireless domain of a plurality of wireless domains, a selected service provider of a plurality of service providers associated with providing a network service to a communication network, and a selected network node of a plurality of network nodes. The method also comprises causing the new data to be added to the central repository and sorted according to a generated configuration profile based on the information received by way of the plurality of parameter input fields. The method also comprises causing a new data added success message to be sent to at least one of a user associated with the user credentials or a network operator having access to the list of the stored data.

Another aspect of this description is related to a non-transitory computer readable having instructions stored thereon that, when executed by the processor, cause an apparatus to process user credentials received by way of a graphical user interface output by a display, retrieve a user profile associated with the user credentials from a database, and access a central repository to retrieve stored data based on the user profile. The apparatus is also caused to cause a list of the stored data corresponding to the user profile to be displayed by way of the graphical user interface. The stored data is displayed according to a plurality of sortable parameters indicative of the stored data included in the list. The apparatus is also caused to process a user input received by way of the graphical user interface to add new data to the central repository and cause a configuration profile user interface to be output by the display. The configuration profile user interface comprises a plurality of parameter input fields configured to receive information identifying a selected wireless domain of a plurality of wireless domains, a selected service provider of a plurality of service providers associated with providing a network service to a communication network, and a selected network node of a plurality of network nodes. The apparatus is also caused to cause the new data to be added to the central repository and sorted according to a generated configuration profile based on the information received by way of the plurality of parameter input fields. The apparatus is also caused to cause a new data added success message to be sent to at least one of a user associated with the user credentials or a network operator having access to the list of the stored data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus, comprising:
a processor; and
a memory having instructions stored thereon that, when executed by the processor, cause the apparatus to:
process user credentials received by way of a graphical user interface output by a display, retrieve a user profile associated with the user credentials from a database, and access a central repository to retrieve stored data based on the user profile;
cause a list of the stored data corresponding to the user profile to be displayed by way of the graphical user interface, wherein the stored data is displayed according to a plurality of sortable parameters indicative of the stored data included in the list;
process a user input received by way of the graphical user interface to add new data to the central repository and cause a configuration profile user interface to be output by the display, the configuration profile user interface comprising:
a plurality of parameter input fields configured to receive information identifying a selected wireless domain of a plurality of wireless domains, a selected service provider of a plurality of service providers associated with providing a network service to a communication network, and a selected network node of a plurality of network nodes; and
a bulk data input field configured to receive one or more data files;
generate a category to be included in the list of the stored data based on a scanning and processing of the one or more data files received by way of the bulk data input field, wherein the category is automatically generated based on the selected wireless domain, the selected service provider, and the selected network node;

cause the new data to be added to the central repository and sorted according to a generated configuration profile based on the information received by way of the plurality of parameter input fields; and cause a new data added success message to be sent to at least one of a user associated with the user credentials or a network operator having access to the list of the stored data, wherein the new data facilitates monitoring of the communication network.

2. The apparatus of claim 1, wherein the plurality of parameter input fields are further configured to receive information identifying a selected wireless technology of a plurality of wireless technologies associated with the network service, a selected time interval for providing the new data to the central repository, a category name, and a software version.

3. The apparatus of claim 2, wherein the plurality of parameter input fields are further configured to receive information identifying a counter identifier, a counter name, a release number, a counter type, a sampling interval, and a trigger type.

4. The apparatus of claim 2, wherein at least three of the plurality of parameter input fields are identified in the configuration profile user interface as required input fields based on one or more of the software version or a selected manner for receiving the new data, and the apparatus is further caused to prevent the new data from being received unless the required input fields are populated with the information each of the required input fields are configured to receive.

5. The apparatus of claim 1, wherein the apparatus is further caused to:

limit the list of the stored data included in the graphical user interface based on the received user credentials being associated with the selected service provider to only the stored data received by the central repository from the selected service provider; and cause all of the stored data in the central repository to be viewable by way of the graphical user interface based on the received user credentials associated with the network operator.

6. The apparatus of claim 1, wherein the category is one of a plurality of categories generated based on the scanning and processing of the one or more data files received by way of the bulk data input field.

7. The apparatus of claim 6, wherein the selected wireless domain, the selected service provider, and the selected network node are a minimum required quantity of parameter input fields among the plurality of parameter input fields for facilitating generation of the plurality of categories.

8. A method, comprising:

processing, by a processor, user credentials received by way of a graphical user interface output by a display to facilitate retrieving a user profile associated with the user credentials from a database and accessing a central repository to retrieve stored data based on the user profile;

causing a list of the stored data corresponding to the user profile to be displayed by way of the graphical user interface, wherein the stored data is displayed according to a plurality of sortable parameters indicative of the stored data included in the list;

processing a user input received by way of the graphical user interface to add new data to the central repository and cause a configuration profile user interface to be output by the display, the configuration profile user interface comprising:

a plurality of parameter input fields configured to receive information identifying a selected wireless domain of a plurality of wireless domains, a selected service provider of a plurality of service providers associated with providing a network service to a communication network, and a selected network node of a plurality of network nodes; and a bulk data input field configured to receive one or more data files;

generating a category to be included in the list of the stored data based on a scanning and processing of the one or more data files received by way of the bulk data input field, wherein the category is automatically generated based on the selected wireless domain, the selected service provider, and the selected network node;

causing the new data to be added to the central repository and sorted according to a generated configuration profile based on the information received by way of the plurality of parameter input fields; and causing a new data added success message to be sent to at least one of a user associated with the user credentials or a network operator having access to the list of the stored data, wherein the new data facilitates monitoring of the communication network.

9. The method of claim 8, wherein the plurality of parameter input fields are further configured to receive information identifying a selected wireless technology of a plurality of wireless technologies associated with the network service, a selected time interval for providing the new data to the central repository, a category name, and a software version.

10. The method of claim 9, wherein the plurality of parameter input fields are further configured to receive information identifying a counter identifier, a counter name, a release number, a counter type, a sampling interval, and a trigger type.

11. The method of claim 9, wherein at least three of the plurality of parameter input fields are identified in the configuration profile user interface as required input fields based on one or more of the software version or a selected manner for receiving the new data, and the apparatus is further caused to prevent the new data from being received unless the required input fields are populated with the information each of the required input fields are configured to receive.

12. The method of claim 8, further comprising:

limiting the list of the stored data included in the graphical user interface based on the received user credentials being associated with selected service provider to only the stored data received by the central repository from the selected service provider; and causing all of the stored data in the central repository to be viewable by way of the graphical user interface based on the received user credentials associated with the network operator.

13. The method of claim 8, wherein the category is one of a plurality of categories generated based on the scanning and processing of the one or more data files received by way of the bulk data input field.

14. The method of claim 13, wherein the selected wireless domain, the selected service provider, and the selected network node are a minimum required quantity of parameter input fields among the plurality of parameter input fields for facilitating generation of the plurality of categories.

15. A non-transitory computer readable medium having instructions stored thereon that, when executed by a processor, cause an apparatus to:
  process user credentials received by way of a graphical user interface output by a display, retrieve a user profile associated with the user credentials from a database, and access a central repository to retrieve stored data based on the user profile;
  cause a list of the stored data corresponding to the user profile to be displayed by way of the graphical user interface, wherein the stored data is displayed according to a plurality of sortable parameters indicative of the stored data included in the list;
  process a user input received by way of the graphical user interface to add new data to the central repository and cause a configuration profile user interface to be output by the display, the configuration profile user interface comprising:
    a plurality of parameter input fields configured to receive information identifying a selected wireless domain of a plurality of wireless domains, a selected service provider of a plurality of service providers associated with providing a network service to a communication network, and a selected network node of a plurality of network nodes; and
    a bulk data input field configured to receive one or more data files;
  generate a category to be included in the list of the stored data based on a scanning and processing of the one or more data files received by way of the bulk data input field, wherein the category is automatically generated based on the selected wireless domain, the selected service provider, and the selected network node;
  cause the new data to be added to the central repository and sorted according to a generated configuration profile based on the information received by way of the plurality of parameter input fields; and
  cause a new data added success message to be sent to at least one of a user associated with the user credentials or a network operator having access to the list of the stored data,
  wherein the new data facilitates monitoring of the communication network.

16. The non-transitory computer readable medium of claim 15, wherein the plurality of parameter input fields are further configured to receive information identifying a selected wireless technology of a plurality of wireless technologies associated with the network service, a selected time interval for providing the new data to the central repository, a category name, and a software version.

17. The non-transitory computer readable medium of claim 16, wherein the plurality of parameter input fields are further configured to receive information identifying a counter identifier, a counter name, a release number, a counter type, a sampling interval, and a trigger type.

18. The non-transitory computer readable medium of claim 16, wherein at least three of the plurality of parameter input fields are identified in the configuration profile user interface as required input fields based on one or more of the software version or a selected manner for receiving the new data, and the apparatus is further caused to prevent the new data from being received unless the required input fields are populated with the information each of the required input fields are configured to receive.

19. The non-transitory computer readable medium of claim 15, wherein the category is one of a plurality of categories generated based on the scanning and processing of the one or more data files received by way of the bulk data input field.

20. The non-transitory computer readable medium of claim 19, wherein the selected wireless domain, the selected service provider, and the selected network node are a minimum required quantity of parameter input fields among the plurality of parameter input fields for facilitating generation of the plurality of categories.

* * * * *